United States Patent
Uematsu et al.

(10) Patent No.: US 12,332,818 B2
(45) Date of Patent: Jun. 17, 2025

(54) DISTRIBUTED SYSTEM AND DATA TRANSFER METHOD

(71) Applicant: HITACHI, LTD., Tokyo (JP)

(72) Inventors: Yutaka Uematsu, Tokyo (JP); Tadanobu Toba, Tokyo (JP); Kenichi Shimbo, Tokyo (JP); Takumi Uezono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 18/551,650

(22) PCT Filed: Apr. 1, 2022

(86) PCT No.: PCT/JP2022/017001
§ 371 (c)(1),
(2) Date: Sep. 21, 2023

(87) PCT Pub. No.: WO2022/215669
PCT Pub. Date: Oct. 13, 2022

(65) Prior Publication Data
US 2024/0176755 A1    May 30, 2024

(30) Foreign Application Priority Data
Apr. 8, 2021    (JP) .................................. 2021-065653

(51) Int. Cl.
*G06F 13/36*    (2006.01)
(52) U.S. Cl.
CPC .......... *G06F 13/36* (2013.01); *G06F 2213/40* (2013.01)
(58) Field of Classification Search
None
See application file for complete search history.

(56) References Cited

U.S. PATENT DOCUMENTS

2022/0246035 A1*    8/2022    Garg .................. G07C 5/008

FOREIGN PATENT DOCUMENTS

JP    2005-300390 A    10/2005

OTHER PUBLICATIONS

International Search Report with English Translation and Written Opinion of International Patent Application No. PCT/JP2022/017001 dated Jun. 21, 2022 (8 pages).

* cited by examiner

*Primary Examiner* — Scott C Sun
(74) *Attorney, Agent, or Firm* — Foley & Lardner LLP

(57) ABSTRACT

It is possible to reduce the amount of data transmitted from the edge system to the outside while securing the amount of information necessary for purposes such as factor analysis and diagnosis and the cycle of information acquisition. A distributed system includes: an edge device that is a moving body or equipment capable of automatic operation; and a diagnostic data computer. The edge device has: at least one of a movement mechanism and an actuation mechanism for implementing automatic operation; a component corresponding to at least one of the movement mechanism and the actuation mechanism; and an intra-edge controller that controls the component. The intra-edge controller reads state data acquired in the component, aggregates the read state data into component-level state data, determines an allowable latency when transferring the component-level state data to a transfer destination according to a predetermined rule, and transfers the component-level state data to the diagnostic data computer based on the allowable latency.

11 Claims, 7 Drawing Sheets

DISTRIBUTED SYSTEM AND DATA TRANSFER METHOD

TECHNICAL FIELD

The present invention relates to a distributed system and a data transfer method. The present invention claims priority to Japanese Patent Application No. 2021-065653 filed on Apr. 8, 2021, and for designated countries where incorporation by reference to documents is permitted, the content described in the application is incorporated herein by reference.

BACKGROUND ART

In an edge device such as a vehicle or a robot including a movement mechanism represented by a motor or an engine and an actuation mechanism represented by an actuator, it is assumed that a controller in the edge device that controls the movement mechanism, the actuation mechanism, and the like becomes complicated in order to achieve automatic operation of the edge device. In this case, the controller in the edge device detects various types of state data of the movement mechanism and the actuation mechanism, and transfers the detected state data to an external server device that determines the maintenance time of the edge device and analyzes accident factors or the like.

Regarding data transfer from the edge device to the outside, for example, Patent Literature 1 describes a configuration in which a monitoring device mounted in a vehicle includes an interface for communicating with a diagnosis device, an ECU, a server device, and the like, and upon receipt of a request from the diagnosis device, a communication connection destination is selected based on a vehicle state, and information is acquired from the connection destination and is transmitted to the diagnosis device.

CITATION LIST

Patent Literature

Patent Literature 1: JP 2005-300390 A

SUMMARY OF INVENTION

Technical Problem

According to the technique described in Patent Literature 1, the monitoring device monitors an internal state (particularly anomalous state) of each component in an ECU, collects physical state data specific to each component, and transmits the physical state data to the outside of the edge device. Therefore, the type and format of data are unique to each component and hardware configuration mounted in the edge device, and the amount of data to be transferred is large since the physical data is transferred as it is.

The present invention has been made in view of such circumstances, and an object of the present invention is to reduce the amount of data transferred from an edge system to the outside while securing an amount of information necessary for purposes such as factor analysis and diagnosis and a cycle of information acquisition.

Solution to Problem

The present application includes a plurality of means for solving at least some of the above problems, and examples thereof are as follows.

In order to solve the above problem, a distributed system according to an aspect of the present invention is a distributed system including: an edge device that is a moving body or equipment capable of automatic operation; and a diagnostic data computer. The edge device includes: at least one of a movement mechanism and an actuation mechanism for implementing automatic operation; a component corresponding to at least one of the movement mechanism and the actuation mechanism; and an intra-edge controller that controls the component. The intra-edge controller reads state data acquired in the component, aggregates the read state data into component-level state data, determines an allowable latency when transferring the component-level state data to a transfer destination according to a predetermined rule, and transfers the component-level state data to the diagnostic data computer based on the allowable latency.

Advantageous Effects of Invention

According to the present invention, it is possible to reduce the amount of data transmitted from the edge system to the outside while securing the amount of information necessary for purposes such as factor analysis and diagnosis and the cycle of information acquisition.

Problems, configurations, and effects other than those described above will be clarified by the following description of embodiments.

DESCRIPTION OF EMBODIMENTS

Figure 1:
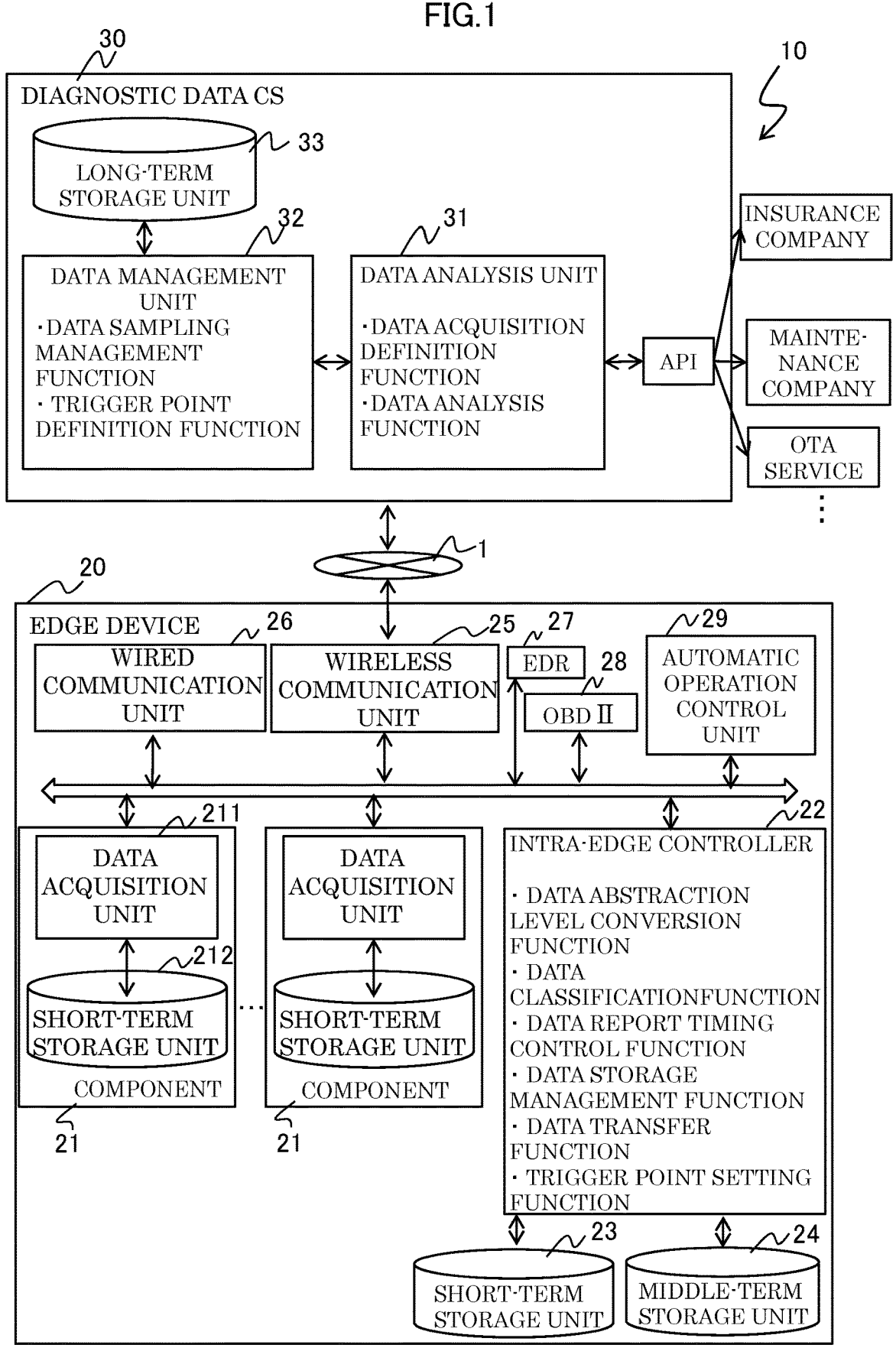
FIG. 1 is a diagram illustrating a configuration example of a distributed system according to an embodiment of the present invention.

The following description of embodiments will be divided into a plurality of sections or embodiments when it is necessary for the sake of convenience. However, unless otherwise specified, the sections or embodiments are not unrelated to each other but are in a relationship in which one constitutes some or all modifications, details, supplementary explanation, and the like of the other.

In the following embodiments, when the number of elements or the like (including number, numerical value, amount, range, and the like) is mentioned, the number is not limited to a specific number unless otherwise specified or obviously limited to the specific number in principle. The number may be equal to or greater than the specific number or may be equal to or less than the specific number.

In the following embodiments, it goes without saying that the components (including element steps and the like) are not necessarily essential unless otherwise specified or considered to be obviously essential in principle.

Similarly, in the following embodiments, when referring to the shapes, positional relationships, and the like of the components and the like, it is assumed that those substantially approximate or similar to the shapes and the like are included unless otherwise stated or unless clearly considered in principle. The same applies to the above numerical values and ranges.

In all the drawings for describing the embodiments, the same members are denoted by the same reference numerals in principle, and repeated description thereof will be omitted. Hereinafter, each embodiment of the present invention will be described with reference to the drawings.

<Configuration Example of Distributed System 10 According to One Embodiment of the Present Invention>

FIG. 1 illustrates a configuration example of a distributed system 10 according to an embodiment of the present invention.

The distributed system 10 includes an edge device 20 and a diagnostic data cloud server (CS) 30. The edge device 20 is connected to the diagnostic data cloud server 30 via a network 1. The network 1 is a bidirectional communication network represented by a mobile phone communication network, the Internet (including Ethernet), and the like, for example.

The edge device 20 is assumed to be an automatically operable moving body (for example, a vehicle, a drone, or a robot) or equipment (for example, a robot arm, a machine tool, a numerical control lathe, or the like), for example. The automatic operation here refers to operation by electronic control, and includes not only fully automatic operation that does not require human control, but also partially automatic operation in which a part of the movable portion is automatically electronically controlled, and automatic operation under a limited condition. As an example, the edge device 20 may be a vehicle capable of automatic driving.

The edge device 20 includes a plurality of components 21, an intra-edge controller 22, a short-term storage unit 23, a middle-term storage unit 24, a wireless communication unit 25, a wired communication unit 26, an event data recorder (EDR) 27, an on-board diagnosis (OBD) II 28, and an automatic operation control unit 29.

The component 21 here refers to a functional, logical, or physical component for implementing various mechanisms such as a movement mechanism and an actuation mechanism included in the edge device 20.

There is a dependency between the plurality of components 21. For example, a first component may be a physical component, and a second component may be a functional component provided based on the first component.

Each component 21 includes a data acquisition unit 211 and a short-term storage unit 212.

In each component, the data acquisition unit 211 acquires state data representing the state of the component 21 from the register, the log data, and the like in the component 21 according to the definition of data acquisition (the type of detailed information to be acquired and the sensing cycle) by a data analysis unit 31 of the diagnostic data cloud server 30.

The short-term storage unit 212 includes a volatile memory such as a dynamic random access memory (DRAM), a ferroelectric RAM (FRAM), or a magnetoresistive RAM (MRAM), for example, temporarily stores the state data acquired by the data acquisition unit 211, and overwrites the old state data with new state data when the storage capacity becomes full.

The intra-edge controller 22 includes a computer such as an electronic control unit (ECU), a central processing unit (CPU), or an application specific integrated circuit (ASIC), for example. The intra-edge controller 22 reads the state data stored in the short-term storage unit 212 of the component 21 and executes a series of processes until transmission of the state data to the diagnostic data cloud server 30. The intra-edge controller 22 has a data abstraction level conversion function, a data classification function, a data report timing control function, a data storage management function, a data transfer function, and a trigger point setting function.

The data abstraction level conversion function reads the state data stored in the short-term storage unit 212 of the component 21 in a sampling cycle designated by data management unit 32 of the diagnostic data cloud server 30 with the trigger timing set by the trigger point setting function as a starting point, performs abstraction level conversion to aggregate the read state data according to a rule designated by the diagnostic data cloud server 30, thereby to convert the state data into status information having a smaller data amount than the state data or safety alarm information having a further smaller data amount. However, the state data may be directly used as detailed information, that is, may not be converted.

For example, the state data is a register value or log data in the component 21, has a data amount of 100 bits or more, and is transferred to the diagnostic data cloud server 30 at intervals of about 1 millisecond. The status information has a data amount of about several 10 bits representing normality or failure in each component, and is transferred to the diagnostic data cloud server 30 at intervals of about 0.1 seconds. The safety alarm information has a data amount of about several bits representing safety or danger of each mechanism implemented by the component 21, and is transferred to the diagnostic data cloud server 30 at an interval of about 1 second. The transfer time interval and the transfer destination described here are examples. The information is transferred to a desired transfer destination at appropriate intervals according to the application. Hereinafter, the safety alarm information, the status information, or the detailed information obtained by converting the abstraction level of the state data will be called component-level state data.

As the rule of abstraction level conversion, a table of correspondence between (an identifier indicating) the type of the state data, (an identifier indicating) the type of the component 21 that has acquired the state data, and the type of the component-level state data (safety alarm information, status information, or detailed information) may be used, for example.

The data abstraction level conversion function determines an allowable latency that indicates a time margin until the component-level state data is transferred to the transfer destination such as the diagnostic data cloud server 30 according to a rule designated by the diagnostic data cloud server 30. In principle, the allowable latency is a time starting from the timing at which the original state data of the component-level state data was acquired by the component 21. Alternatively, the allowable latency may be a time starting from the timing with which the intra-edge controller 22 read the state data from the component 21.

As the rule of determining the allowable latency, a table of correspondence among (an identifier indicating) the type of the component 21 that has acquired the state data, the type of the component-level state data, and the allowable latency, and the like may be used. As a specific example of the allowable latency determination rule, a relatively long allowable latency may be determined for component-level state data that is less important and does not need to be transferred to the transfer destination depending on the situation, for example.

For example, determining the allowable latency according to the type of the component 21 (functional component, physical component, or the like) that has acquired the original state data of the component-level state data makes it possible to, if there is a problem in the functional component of the edge device 20, shorten the allowable latency of the corresponding physical component.

The data classification function classifies the component-level state data based on the allowable latency and the abstraction level representing whether the component-level state data is safety alarm information, status information, or detailed information. The data classification function calculates a priority in transferring the component-level state data to the transfer destination such as the diagnostic data cloud server 30 according to a rule designated by the diagnostic data cloud server 30.

As a rule of priority calculation, a predetermined calculation formula may be used using the classification result of the component-level state data (combination of the abstraction level and the allowable latency) and the type of the component 21 from which the original state data has been acquired as parameters.

Figure 2:
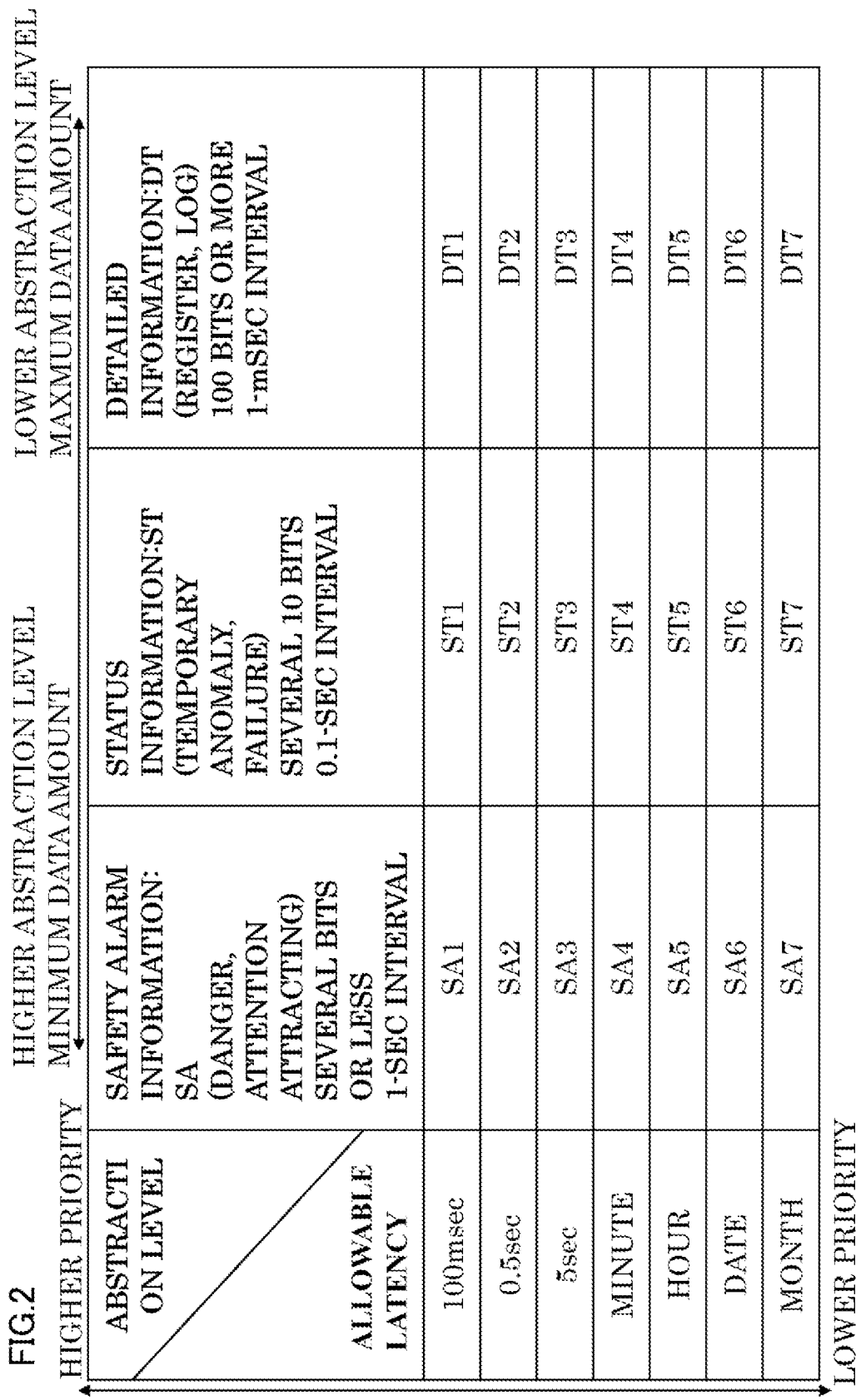
FIG. 2 is a diagram illustrating a method of classifying component-level state data.

FIG. 2 is a diagram for describing a method of classifying the component-level state data. In the case of the drawing, the allowable latency is classified into seven types. Therefore, there are 21 combinations of the three types of abstraction level and the seven types of allowable latency, and the data classification function classifies the component-level state data into any of the 21 types. The number of types of allowable latency is not limited to seven, and may be smaller or larger.

The description returns to FIG. 1. The data report timing control function determines the transfer destination of the component-level state data according to the specification by the diagnostic data cloud server 30, and determines the transfer time of transfer to the transfer destination based on the allowable latency and the priority. For example, the transfer time of the component-level state data may be temporarily determined at random within the range of the allowable latency, and if the transfer time overlaps with the transfer time of other component-level state data, the temporarily determined transfer time may be adjusted according to the priority.

The data storage management function adds a header 100 (FIG. 3) to the component-level state data. The data storage management function determines the storage destination (the short-term storage unit 23 or the middle-term storage unit 24) of the component-level state data based on the allowable latency of the component-level state data and the storage limit of the short-term storage unit 23, and stores the component-level state data to which the header 100 is added to the determined storage destination. The data storage management function erases the component-level state data after lapse of the transfer time among the component-level state data stored in the short-term storage unit 23 and the middle-term storage unit 24, regardless of whether the component-level state data has been actually transferred.

Figure 3:
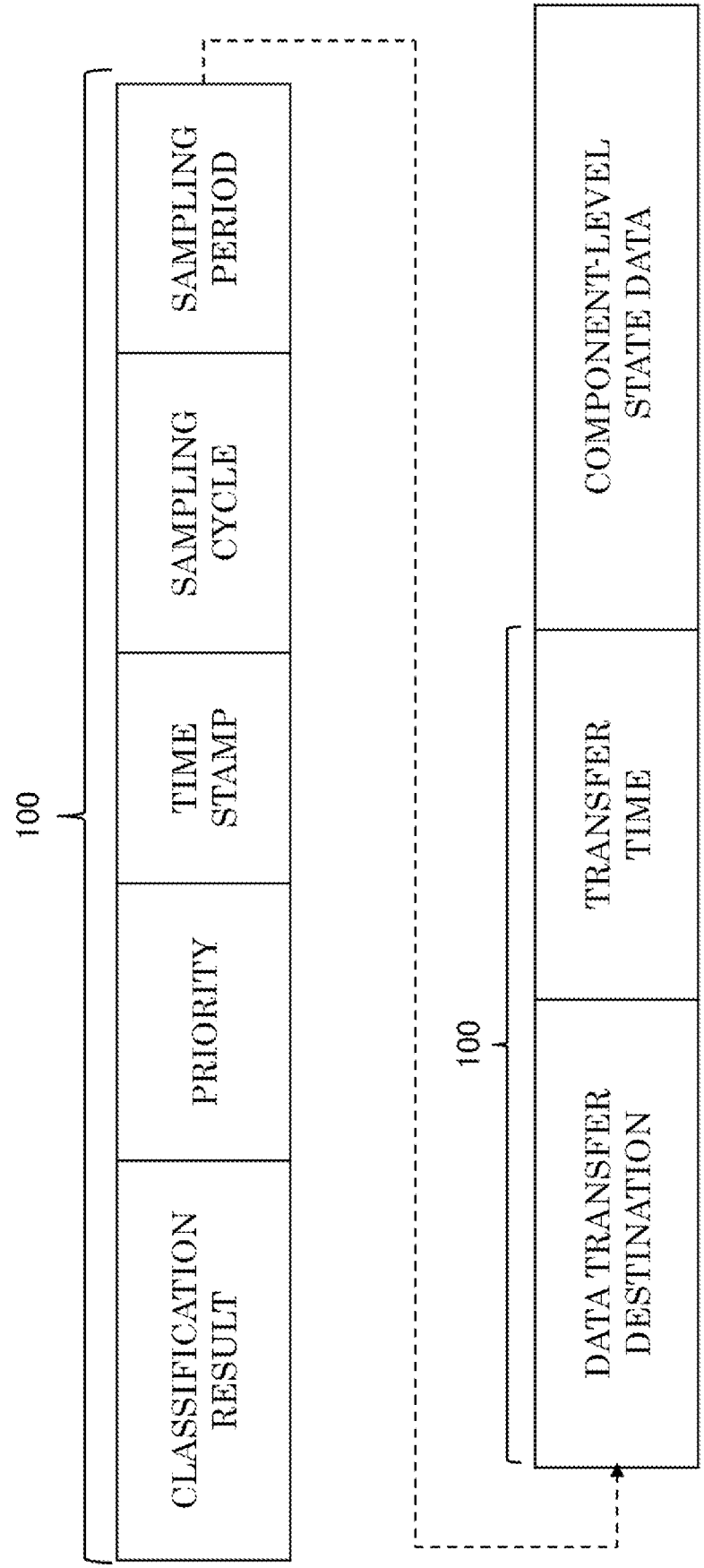
FIG. 3 is a diagram illustrating an example of a header of the component-level state data.

FIG. 3 illustrates an example of a data structure of the header 100 added to the component-level state data.

In the header 100, the classification result, the priority, the time stamp, the sampling cycle, the sampling period, the data transfer destination, and the transfer time are recorded.

As the classification result, the classification result (SA1, SA2, or the like in FIG. 2) obtained by the data classification function is recorded. As the priority, the priority calculated by the data classification function is recorded. As the time stamp, the absolute time when the state data before conversion was acquired by the component 21 is recorded. As the sampling cycle and the sampling period, the cycle and the period in which the state data before conversion was sampled from the short-term storage unit 212 of the component 21 to the intra-edge controller 22 are recorded. As the data transfer destination, the transfer destination (automatic operation control unit 29, the diagnostic data cloud server 30, or the like) of the component-level state data determined by the data report timing control function is recorded. As the transfer time, the time at which the component-level state data determined by the data report timing control function was transferred to the transfer destination is recorded. As the transfer time, an absolute time may be recorded, or a relative time starting from a time stamp may be recorded.

The description returns to FIG. 1. The data transfer function transfers each component-level state data temporarily stored in the short-term storage unit 23 and the middle-term storage unit 24 to the transfer destination recorded in the header, with the timing of arrival of the transfer time recorded in the header.

The trigger point setting function sets or changes a trigger point that serves as a starting point from which the state data stored in the short-term storage unit 212 of the component 21 is read, in accordance with the definition of the trigger point by the data management unit 32 of the diagnostic data cloud server 30. The trigger point is defined by a time at which an event such as an accident or a failure occurs, a timing with which the state data exceeds a predetermined threshold, or the like, for example.

The short-term storage unit 23 includes a volatile memory such as DRAM, FRAM, or MRAM, and temporarily stores the component-level state data having a relatively short allowable latency, for example. If the storage capacity of the short-term storage unit 23 becomes full, it is desirable to shorten the allowable latency of the component-level state data as a whole to transfer the component-level state data temporarily stored in the short-term storage unit 23 more quickly. Alternatively, the non-transferred old component-level state data stored in the short-term storage unit 23 may be erased.

The middle-term storage unit 24 includes a non-volatile memory such as a solid state drive (SSD) or a flash memory, for example, and temporarily stores component-level state data having a relatively long allowable latency. The short-term storage unit 23 and the middle-term storage unit 24 correspond to different types of storage resources of the present invention.

The wireless communication unit 25 wirelessly connects to the diagnostic data cloud server 30 via the network 1 to communicate various types of data. The wireless communication unit 25 is used for daily communication between the edge device 20 and the diagnostic data cloud server 30. The wired communication unit 26 is connected to a predetermined diagnostic device via a cable to communicate various types of data. The wired communication unit 26 is used in inspection, maintenance, accident analysis, and the like of the edge device 20 at a maintenance factory or the like, for example.

In response to the occurrence of an event such as a collision occurring in the edge device 20, the EDR 27 acquires state data such as the moving speed of the edge device 20 in the time before and after the event from the component 21 and records the state data in time series. The OBD II 28 autonomously diagnoses a failure in the edge device 20. The automatic operation control unit 29 controls automatic operation of the edge device 20 (for example, automatic driving in a case where the edge device 20 is a vehicle, or the like).

The diagnostic data cloud server 30 acquires the component-level state data from the edge device 20 and performs analysis processing on the component-level state data, thereby to determine the maintenance time of the edge device 20 and identify the cause of a failure in the edge device 20. The diagnostic data cloud server 30 then transmits the results of determination on the maintenance time of the edge device 20 and the identified failure factor, in response to a request via an application programming interface (API) from a computer for a service provider in an insurance company, a maintenance company, or the like that provides services related to the edge device 20.

The diagnostic data cloud server 30 includes one or more computers existing on the network 1. In the present embodiment, one or more computers existing locally may be adopted instead of a cloud server such as the diagnostic data cloud server 30. Conversely, a cloud server may be adopted instead of the local computer. The diagnostic data cloud server 30 corresponds to a diagnostic data computer of the present invention.

The diagnostic data cloud server 30 includes a data analysis unit 31, a data management unit 32, and a long-term storage unit 33.

The data analysis unit 31 has a data acquisition definition function and a data analysis function. The data acquisition definition function defines the type of state data to be acquired by each component 21 of the edge device 20 and the sensing cycle. Specifically, based on a change in the component-level state data at a high abstraction level (a small amount of data), the trigger timing, the sampling cycle, and the sampling period are sequentially determined with the component-level state data at a lower abstraction level (a larger amount of data) as an acquisition target, for example.

The data analysis function determines the maintenance time of the edge device 20 and diagnoses the presence or absence of an anomaly in the edge device 20, based on the component-level state data transferred from the edge device 20 and stored in the long-term storage unit 33. If there is an anomaly, the data analysis function analyzes the failure factor that has caused the anomaly, and identifies the failure occurrence site. The failure factor includes a failure of hardware and an anomalous operation by software of each component 21 in the edge device 20. As a method for analyzing the failure factor, for example, correlations between component-level state data and failure factors are compiled into a database, and the failure factor is determined based on the database. As a method for implementing the database, conditions and results may be listed, or machine learning using a neural network may be used. That is, any method may be used as long as the method searches for a form in which the correlation between the component-level state data and the failure factor in the edge device 20. As a method for identifying the failure occurrence site, the site may be determined using the correlation between the component-level state data and the failure factor.

The data management unit 32 has a data sampling management function and a trigger point definition function. The data sampling management function specifies the sampling cycle for the intra-edge controller 22 in the edge device 20 to acquire the state data from the component 21. The data sampling management function defines various rules in the edge device 20 (abstraction level conversion rule, allowable latency determination rule, priority calculation rule, and the like) and transmits the defined rules to the edge device 20. This makes it possible to set the allowable latency suitable for a service related to the edge device 20 (insurance or the like), and perform analysis processing using data acquired with an appropriate timing, for example.

The trigger point definition function specifies a trigger point to be a starting point for the intra-edge controller 22 in the edge device 20 to acquire the state data from the component 21.

The long-term storage unit 33 includes a hard disk drive (HDD), a magnetic tape, or the like, for example, and stores the component-level state data transferred from the edge device 20. In this manner, differentiating between the long-term storage unit 33 and the short-term storage units 212, 23 and the middle-term storage unit 24 in the edge device 20 as different types of hardware with differences in the data transfer speed and the lifetime of the storage makes it possible to optimize the cost per unit data amount and the reliability of data to be stored.

<Configuration Example of Computer 200 Included in Diagnostic Data Cloud Server 30>

Figure 4:
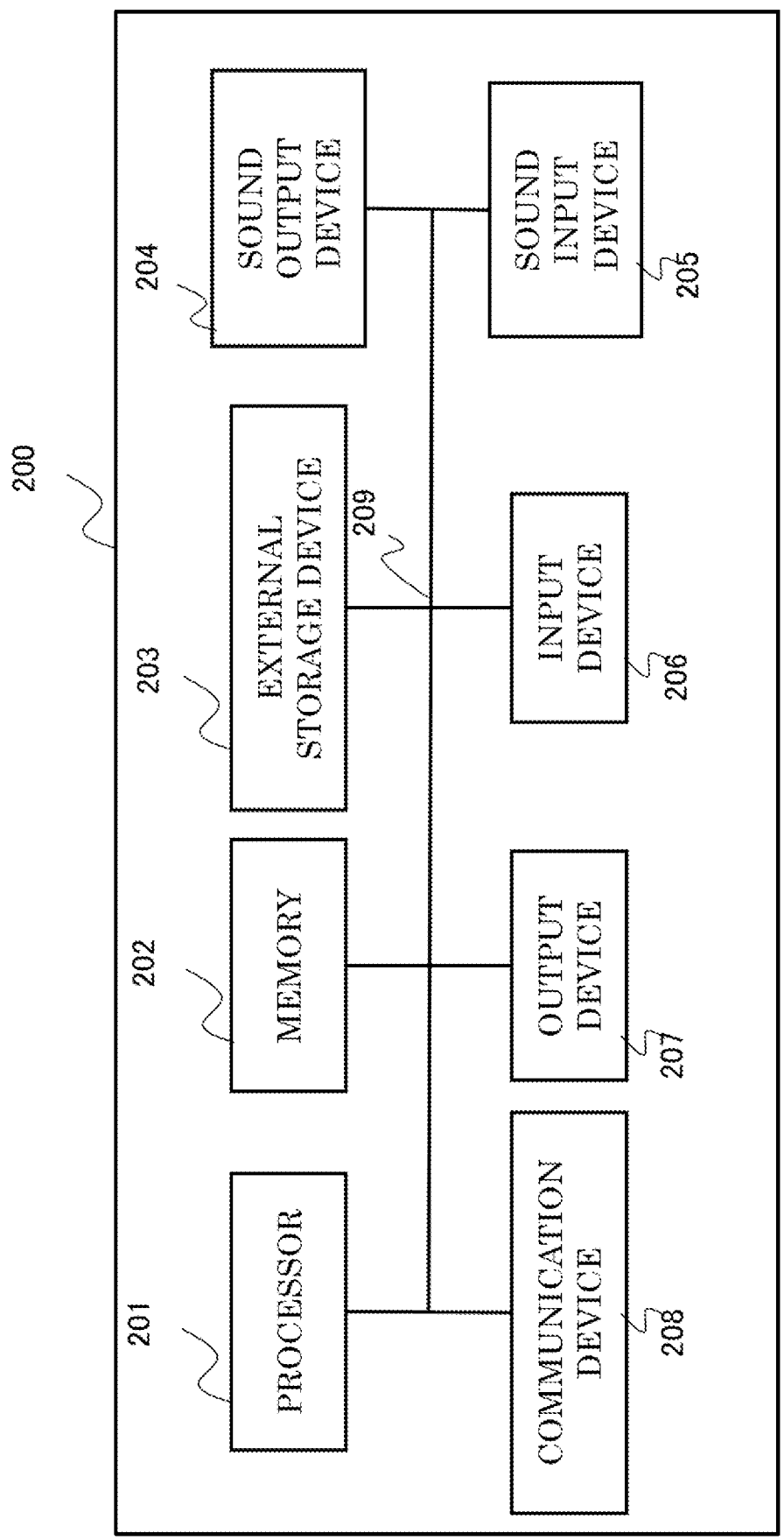
FIG. 4 is a diagram illustrating an example of a hardware configuration of a computer.

FIG. 4 illustrates an example of a hardware configuration of a computer 200 constituting the diagnostic data cloud server 30.

The computer 200 is configured by connecting a processor 201, a memory 202, an external storage device 203, a sound output device 204, a sound input device 205, an input device 206, an output device 207, and a communication device 208 via a data bus 209.

The processor 201 includes a CPU, a GPU, an FPGA, and the like, and controls the entire computer 200. The memory 202 is a main storage device such as a random access memory (RAM), for example. The external storage device 203 is a non-volatile storage device such as an HDD, an SSD, or a flash memory capable of storing digital information.

The sound output device 204 includes a speaker or the like. The sound input device 205 includes a microphone or the like. The input device 206 includes a keyboard, a mouse, a touch panel, and the like. The output device 207 includes a display, a printer, and the like.

The communication device 208 includes a network interface card (NIC), a telematics control unit (TCU), and the like. The communication device 208 communicates with other devices connected to the same network by at least one of wired communication and wireless communication. For the communication, packet communication based on Transmission Control Protocol/Internet Protocol (TCP/IP) is adopted. However, the communication is not limited thereto, and communication based on another protocol such as User Datagram Protocol (UDP) may be adopted.

The hardware configuration of the computer 200 is not limited to the above-described example, and some of the above-described components may be omitted or other components may be included. The computer 200 may be any of various information processing devices such as a server computer, a personal computer, a notebook computer, a tablet computer, a smartphone, and a television device.

The computer 200 can store programs such as an operating system (OS), middleware, and application programs and read such programs from the outside. The computer 200 can execute various processes by the processor 201 executing the programs.

<Data Transfer Processing by Distributed System 10>

Figure 5:
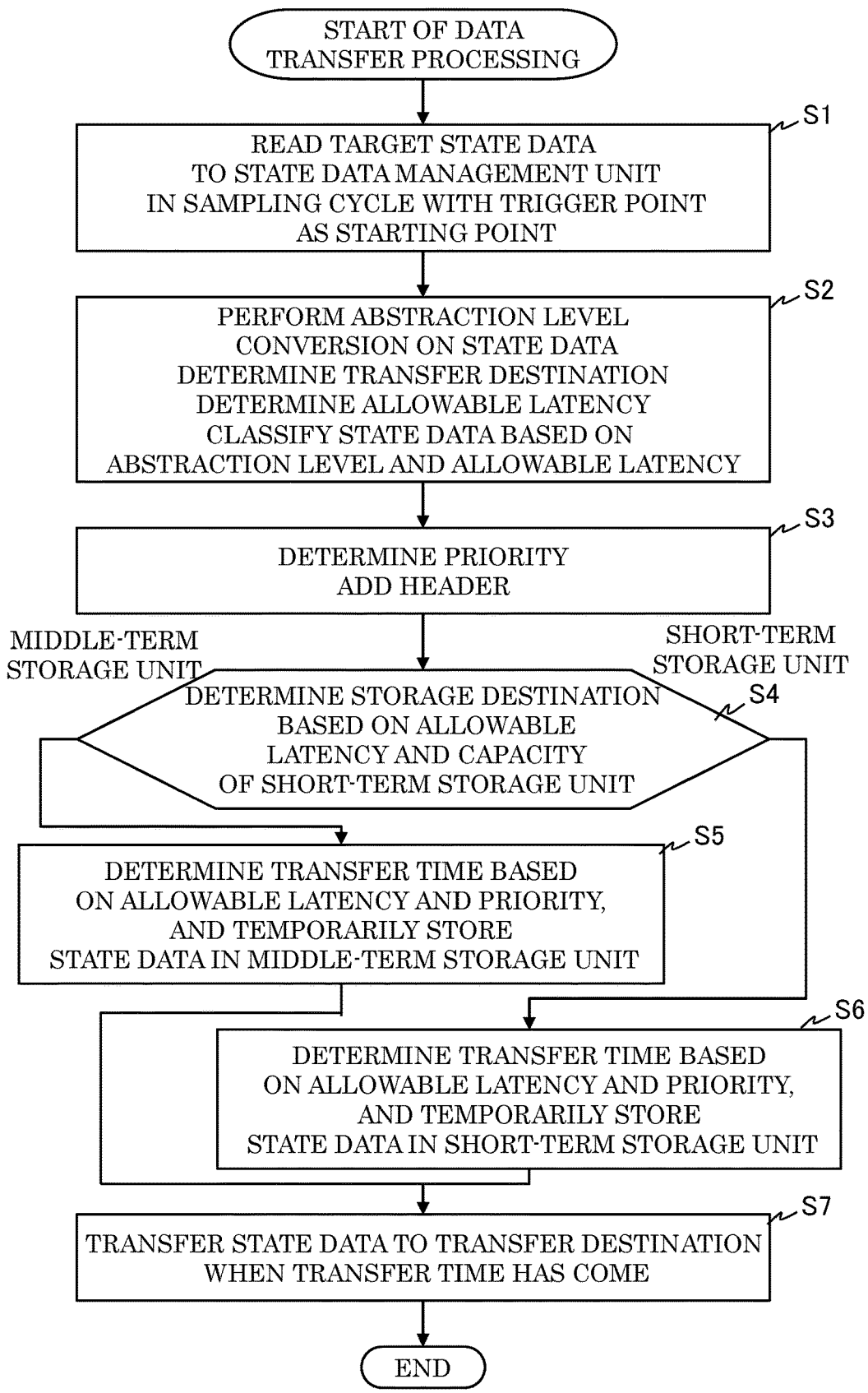
FIG. 5 is a flowchart illustrating an example of data transfer processing.

Next, FIG. 5 is a flowchart illustrating an example of data transfer processing by the distributed system 10.

As a premise, in each component 21 of the edge device 20, the data acquisition unit 211 acquires state data representing the state of the component 21 from the register, the log data, and the like in the component 21 according to the definition of data acquisition (the type of detailed information to be acquired and the sensing cycle) by the data analysis unit 31 of the diagnostic data cloud server 30 and stores the state data in the short-term storage unit 212.

The data transfer processing is started in response to a start instruction from the diagnostic data cloud server 30 to the edge device 20, for example.

First, the intra-edge controller 22 of the edge device 20 reads the state data that is stored in the short-term storage unit 212 of the component 21 designated by the data analysis unit 31 to the intra-edge controller 22, in the sampling cycle designated by the data management unit 32, with the trigger timing based on the definition by the data management unit 32 of the diagnostic data cloud server 30 as a starting point (step S1).

Next, the intra-edge controller 22 performs abstraction level conversion on the transferred state data according to the rule specified by the diagnostic data cloud server 30, aggregates the transferred state data into component-level state data including detailed information, status information, or safety alarm information, determines a transfer destination of the component-level state data, determines an allowable latency of the component-level state data, and classifies the component-level state data based on a combination of the abstraction level and the allowable latency (step S2).

Then, the intra-edge controller 22 calculates the priority of transferring the component-level state data to the transfer destination based on the classification result (combination of the abstraction level and the allowable latency) of the component-level state data and the type thereof (the type of the component 21 from which the original state data was acquired, or the like). The intra-edge controller 22 adds the header 100 in which the classification result, the priority, and the like of the component-level state data are recorded, to the component-level state data (step S3).

Next, the intra-edge controller 22 determines a storage destination (the short-term storage unit 23 or the middle-term storage unit 24) of the component-level state data based on whether the allowable latency of the component-level state data is larger than the storage capacity of the short-term storage unit 23 (step S4).

Specifically, if the allowable latency of the component-level state data is large so that storing the component-level state data in the short-term storage unit 23 may make the short-term storage unit 23 full before transfer of the component-level state data from the short-term storage unit 23, the intra-edge controller 22 determines the storage destination to be the middle-term storage unit 24. Next, the intra-edge controller 22 determines the transfer time at which to transmit the component-level state data to the transfer destination based on the allowable latency and the priority, records the transfer time in the header 100, and temporarily stores the component-level state data to which the header 100 is added in the middle-term storage unit 24 (step S5).

On the other hand, if the allowable latency of the component-level state data is small so that storing the component-level state data in the short-term storage unit 23 may not make the short-term storage unit 23 full before transfer of the component-level state data from the short-term storage unit 23, the intra-edge controller 22 determines the storage destination to be the short-term storage unit 23. Then, the intra-edge controller 22 determines the transfer time to transfer the component-level state data to the transfer destination based on the allowable latency and the priority, records the transfer time in the header 100, and temporarily stores the component-level state data to which the header 100 is added in the short-term storage unit 23 (step S6).

Thereafter, the intra-edge controller 22 transfers the component-level state data stored in the short-term storage unit 23 and the middle-term storage unit 24 to the transfer destination recorded in the header with the timing when the transfer time recorded in the header 100 has come (step S7).

If the edge device 20 is powered off before the component-level state data stored in the short-term storage unit 23 and the middle-term storage unit 24 is transferred, the component-level state data in the short-term storage unit 23 including a volatile memory is erased, but the component-level state data in the middle-term storage unit 24 including a nonvolatile memory is not erased but remains stored. Therefore, among the component-level state data remaining in the middle-term storage unit 24 at the stage when the edge device 20 is powered on again, the component-level state data of which the transfer time has elapsed is erased, and the component-level state data of which the transfer time has not elapsed is transferred to the transfer destination with the timing of the transfer time. As above, the data transfer processing by the distributed system 10 is terminated.

According to the data transfer processing described above, since the state data is aggregated into the component-level state data and the allowable latency is provided, the data amount of the component-level state data to be stored and transferred can be appropriately managed. Since the priority is calculated based on the abstraction level and the allowable latency, it is possible to transfer the component-level state data to the transfer destination with an appropriate timing.

<Use Cases of Distributed System 10>

Next, use cases of the distributed system 10 will be described.

For example, in the case of analyzing the factor of an accident caused by the edge device 20, in order to improve the efficiency of data acquisition, the data management unit 32 of the diagnostic data cloud server 30 causes the intra-edge controller 22 of the edge device 20 to designate the accident occurrence time as the trigger timing, aggregate the state data into detailed information and status information, shorten the allowable latency, and store the state data in the middle-term storage unit 24. Then, the data management unit 32 causes the intra-edge controller 22 to transfer the status information and detailed information selected based on the status information to the diagnostic data cloud server 30. This achieves both the primary investigation and the detailed investigation of the cause of the accident.

For example, if long-term state data from the previous maintenance to the current maintenance is required in order to perform maintenance of the edge device 20, the state data is read in a rough sampling cycle, aggregated into status information, transferred to the diagnostic data cloud server 30, and stored in the long-term storage unit 33. If a failure or the like is detected by the data analysis unit 31 based on the status information in the long-term storage unit 33, a trigger point for acquiring only state data necessary for more detailed analysis is designated, state data in a specific time period is read from the component 21, and transferred to the diagnostic data cloud server 30 as detailed information. This makes it possible to minimize the amount of data transferred from the edge device 20 to the diagnostic data cloud server 30, and reduce the amount of data stored in the storage such as the long-term storage unit 33. Since only the state data necessary for analysis can be transferred to the diagnostic data cloud server 30, the accuracy of maintenance can be maintained.

For example, if the edge device 20 is a vehicle having an automatic driving function, the state data acquired from the component 21 related to the automatic driving function is aggregated into safety alarm information, the allowable latency is minimized, and the transfer destination is set as the automatic operation control unit 29. Accordingly, the state data acquired from the component 21 can be immediately fed back to the automatic operation control unit 29, so that the automatic driving function can be safely controlled.

For example, if the edge device 20 is a vehicle having an automatic driving function, the distributed system 10 is applicable to a symbiotic safety system in which a plurality of vehicles, signals, signs, edge servers, and the like cooperate.

Figure 6:
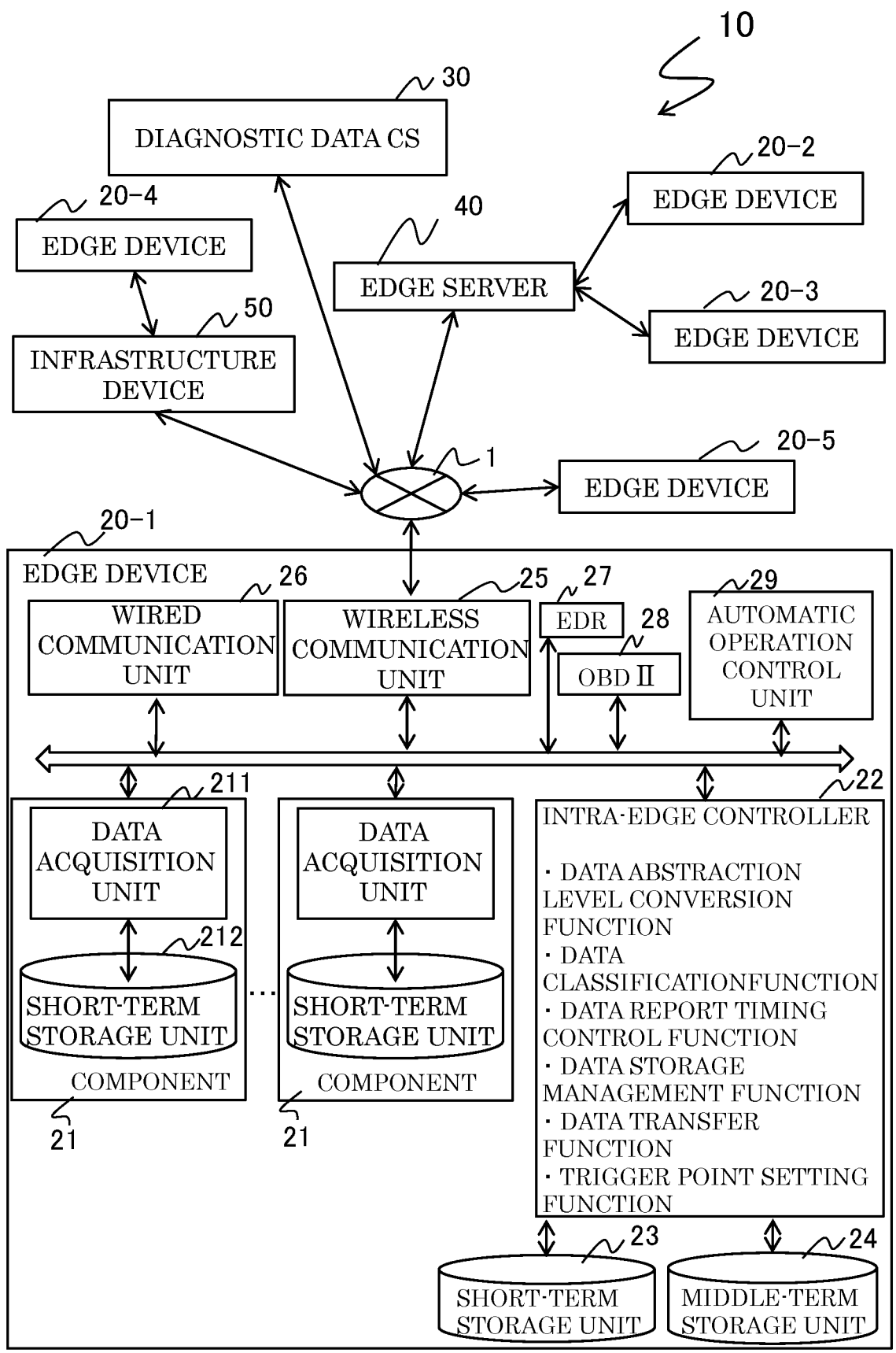
FIG. 6 is a diagram illustrating a configuration example of a symbiotic safety system to which a distributed system is applied.

FIG. 6 illustrates a configuration example of a symbiotic safety system to which the distributed system 10 is applied.

In the symbiotic safety system, if a failure occurs in the automatic driving function of a vehicle that is an edge device 20-1 and the safe state level is lowered, the intra-edge controller 22 of the edge device 20-1 transmits the information to the surroundings according to a transfer destination instruction. Since it is necessary to immediately share the information with the surroundings in order to ensure safety for avoiding an accident or the like, the allowable latency becomes shorter than usual. Therefore, the safety alarm information is transmitted to a related device through a short path.

As a method of transmitting the safety alarm information, a method by which to communicate with peripheral edge device 20-2, edge device 20-3, and the like 3 via an edge server 40 can be considered. The edge server 40 is installed to communicate with the edge device 20 located in a relatively narrow range, and enables processing and communication with a short latency. As a communication method between the edge server 40 and the edge device 20, 5G, 6G, or the like may be used.

It is conceivable that the edge server 40 communicates with an appropriate edge device 20-2 or the like existing in its own periphery, performs predetermined simple processing on the safety alarm information, the surrounding information, and the like acquired from the edge device 20-1, and transmits a specific control command obtained as a result of the processing to the surrounding edge device 20-2 or the like.

As another method of transmitting the safety alarm information, for example, a method of transmitting the safety alarm information to an infrastructure device 50 to ensure safety can be considered. The infrastructure device 50 may be a traffic light, for example. For example, if it is found that there is a vehicle with a lowered safety state level at a certain intersection, it is conceivable that the traffic light at the intersection is changed to red to control other vehicles and people not to approach the vehicle with the lowered safety state level.

As another method of transmitting the safety alarm information in a case where the urgency is higher, it is conceivable to directly communicate information between the edge device 20-1 and an edge device 20-5 using vehicle-to-vehicle (V2V), for example.

Next, a use case of the distributed system 10 with a telematics insurance in a case where the edge device 20 is a vehicle having an automatic driving function will be described.

According to the distributed system 10, information on the state of the edge device 20 in a case possibly leading to an accident is accumulated in the diagnostic data cloud server 30. Therefore, it is possible to statistically obtain the state of the edge device 20 which is likely to lead to an accident, and based on this, it is possible to score a situation in which an accident is likely to occur due to the electronic control from the real-time state acquisition data of each edge device 20. The score can be used to calculate the insurance premium. In addition, based on the accident factor analysis result as described above, the present system is held accountable for the occurrence of an accident, so that it is possible to clarify the responsibility for the accident and provide logic for calculating the burden of the accident cost.

Next, an information cooperation system capable of further enhancing analysis of a failure factor by combining information obtained from the edge device 20 and other information will be described.

Figure 7:
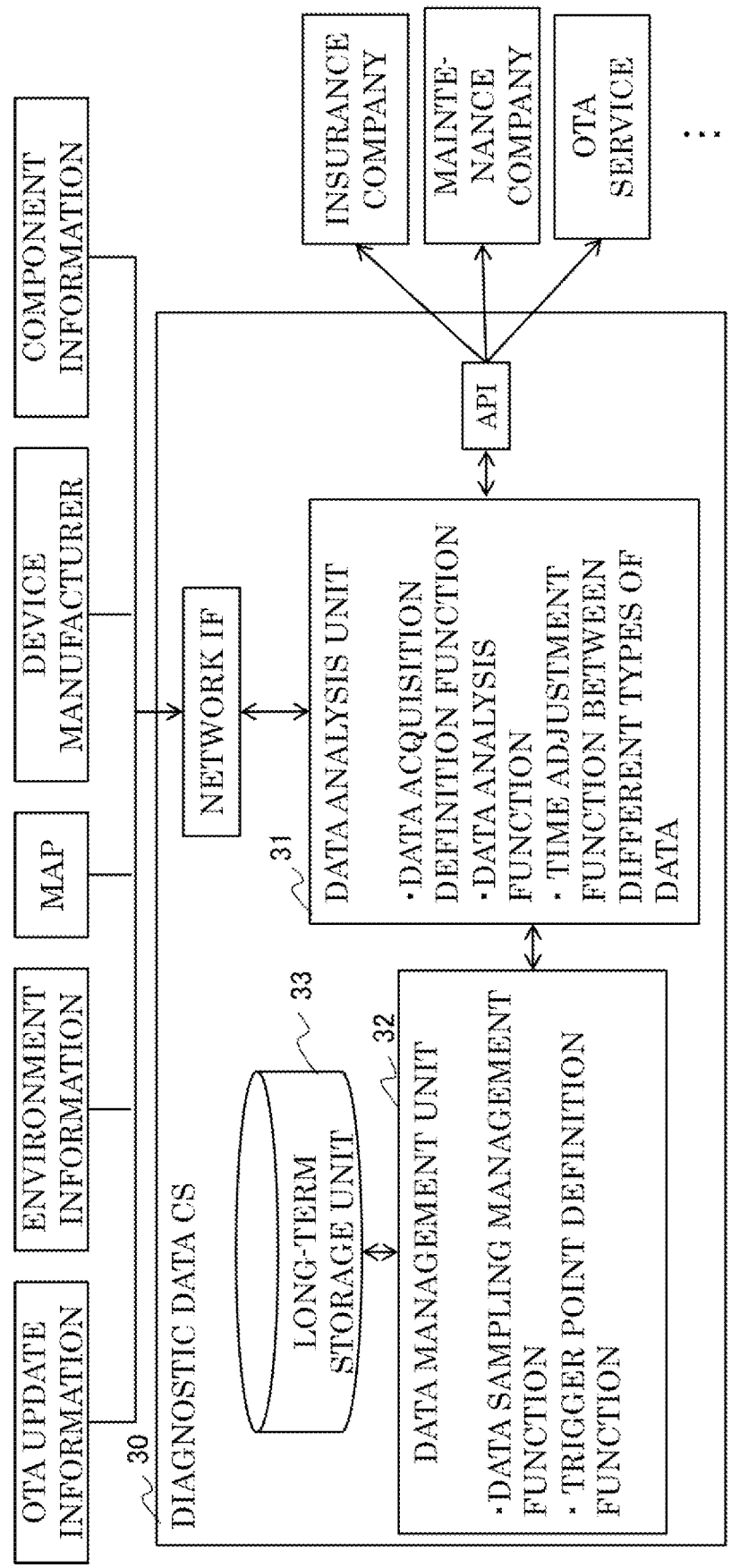
FIG. 7 is a diagram illustrating a configuration example of an information cooperation system to which the distributed system is applied.

FIG. 7 illustrates a configuration example of an information cooperation system to which the distributed system 10 is applied.

Examples of factors of failure occurrence in the edge device 20 include a problem with a radio wave environment in a specific region, a problem related to climate such as temperature and humidity, a problem peculiar to a specific lot at the time of manufacturing, a problem of easiness of failure in a specific component, and a problem with a change in an electronic/electric unit control method due to soft update such as Over the Air (OTA).

If such secondary factors are involved, it is essential to perform analysis including these pieces of information for highly accurate analysis. Therefore, as illustrated in FIG. 7, it is possible to perform analysis with a specific device in association with map information, environment information, manufacturing information, component information, OTA update information, and the like. At the time of the analysis, a time adjustment function between different types of data is used in the data analysis unit 31 in order to clarify the correlation between the time-series information of the diagnostic data collected from the edge device 20 and the secondary factor information.

As described above, the distributed system 10 can provide diagnostic services to various fields. Therefore, the data management unit 32 has a function of defining diagnostic trigger points according to the service content defined for each customer. In addition, the data communication fee can be made appropriate by deleting unnecessary diagnosis trigger points at the end of the service.

The technology according to the present invention is not limited to the distributed system and the data transfer method, and can be provided in various modes such as a computer and a computer-readable program.

The present invention is not limited to the above-described embodiments, and includes various modifications. For example, the above-described embodiments have been described in detail in order to make the present invention easy to understand, and the present invention is not necessarily limited to embodiments including all the components described above. Some of the components of one embodiment can be replaced with or added to components of another embodiment. For example, as an alternative to the acquisition of values from the register, values of variables or log information of programs or scripts executed in the component 21 may be acquired. Some or all of the embodiments described in FIGS. 1, 6, and 7 may be combined.

Some or all of the above-described components, functions, processing units, processing means, and the like may be implemented by hardware designed with an integrated circuit, for example. The above-described components, functions, and the like may be implemented by software by a processor interpreting and executing programs for performing the functions. Information such as programs, tables, and files for implementing the functions can be stored in a recording device such as a memory, a hard disk, and an SSD, or a recording medium such as an IC card, an SD card, and a DVD. The control lines and the information lines indicate what is considered to be necessary for the description, and do not necessarily indicate all the control lines and the information lines on the product. In practice, it may be considered that almost all the components are connected to each other.

REFERENCE SIGNS LIST

1 Network
20 Edge device
10 Distributed system
20 Edge device
21 Component
211 Data acquisition unit
212 Short-term storage unit
22 Intra-edge controller
23 Short-term storage unit
24 Middle-term storage unit
25 Wireless communication unit
26 Wired communication unit
27 EDR
28 OBDII
29 Automatic operation control unit
30 Diagnostic data cloud server
31 Data analysis unit
32 Data management unit
33 Long-term storage unit
40 Edge server
50 Infrastructure device
100 Header
200 Computer
201 Processor
202 Memory
203 External storage device
204 Sound output device
205 Sound input device
206 Input device
207 Output device
208 Communication device
209 Data bus

The invention claimed is:

1. A distributed system comprising:
an edge device that is a moving body or equipment capable of automatic operation; and
a diagnostic data computer, wherein
the edge device includes:
at least one of a movement mechanism and an actuation mechanism for implementing automatic operation;
a component corresponding to at least one of the movement mechanism and the actuation mechanism; and
an intra-edge controller that controls the component, and
the intra-edge controller
reads state data acquired in the component,
aggregates the read state data into component-level state data,
determines an allowable latency when transferring the component-level state data to a transfer destination according to a predetermined rule, and
transfers the component-level state data to the diagnostic data computer based on the allowable latency.

2. The distributed system according to claim 1, wherein the intra-edge controller
aggregates the read state data into the component-level state data equal to or less than in data amount than the state data.

3. The distributed system according to claim 1, wherein the diagnostic data computer
performs analysis processing on the component-level state data transferred from the edge device, updates the predetermined rule based on a result of the analysis processing, and transmits the updated rule to the edge device.

4. The distributed system according to claim 3, wherein the diagnostic data computer
identifies a service associated with the edge device, and
performs the analysis processing corresponding to the specified service on the component-level state data transferred from the edge device, and transmits a result of the analysis processing to a computer for a service provider that provides the specified service.

5. The distributed system according to claim 1, wherein the intra-edge controller
reads the state data from the component in a sampling cycle designated by the diagnostic data computer with a trigger point designated by the diagnostic data computer as a starting point.

6. The distributed system according to claim 5, wherein the diagnostic data computer
performs analysis processing on the component-level state data transferred from the edge device, and designates the trigger point based on a result of the analysis processing.

7. The distributed system according to claim 1, wherein the intra-edge controller
has different types of storage resources that store the component-level state data, and
determines a destination to store the component-level state data, based on the allowable latency determined for the component-level state data.

8. The distributed system according to claim 7, wherein the intra-edge controller
determines a transfer time of the component-level state data based on the allowable latency determined for the component-level state data, and
erases the component-level state data after lapse of the transfer time, among the component-level state data stored in the storage resource.

9. The distributed system according to claim 1, wherein the edge device
has a plurality of the components of different types, and
the intra-edge controller
determines the allowable latency of the component-level state data according to the predetermined rule based on the type of the component for which the original state data of the component-level state data was obtained.

10. The distributed system according to claim 9, wherein the plurality of the components of different types includes a physical component and a functional component provided based on the physical component.

11. A data transfer method of a distributed system including:
- an edge device that is a moving body or equipment capable of automatic operation; and
- a diagnostic data computer,
- the edge device including:
- at least one of a movement mechanism and an actuation mechanism for implementing automatic operation;
- a component corresponding to at least one of the movement mechanism and the actuation mechanism; and
- an intra-edge controller that controls the component,
- the data transfer method comprising:
- reading, by the intra-edge controller, state data acquired in the component;
- aggregating, by the intra-edge controller, the read state data into component-level state data;
- determining, by the intra-edge controller, an allowable latency when transferring the component-level state data to a transfer destination according to a predetermined rule; and
- transferring, by the intra-edge controller, the component-level state data to the diagnostic data computer based on the allowable latency.

* * * * *